(12) United States Patent
Malhotra et al.

(10) Patent No.: US 7,179,549 B2
(45) Date of Patent: Feb. 20, 2007

(54) MAGNETIC RECORDING MEDIUM HAVING NOVEL UNDERLAYER STRUCTURE

(75) Inventors: Sudhir S. Malhotra, Fremont, CA (US); Gerardo Bertero, Redwood City, CA (US); Ching Tsoi, Cupertino, CA (US); Donald Stafford, San Jose, CA (US)

(73) Assignee: Komag, Inc., San Jose, CA (US)

( * ) Notice: Subject to any disclaimer, the term of this patent is extended or adjusted under 35 U.S.C. 154(b) by 247 days.

(21) Appl. No.: 10/761,820

(22) Filed: Jan. 21, 2004

(65) Prior Publication Data
US 2005/0158588 A1    Jul. 21, 2005

(51) Int. Cl.
*G11B 5/66* (2006.01)
*G11B 5/70* (2006.01)

(52) U.S. Cl. .................... 428/831.2; 427/131
(58) Field of Classification Search ............ 428/831, 428/831.2, 831.1
See application file for complete search history.

(56) References Cited

U.S. PATENT DOCUMENTS

| | | | |
|---|---|---|---|
| 4,833,020 A | 5/1989 | Shiroishi et al. | 428/336 |
| 5,922,456 A | 7/1999 | Tanahashi et al. | 428/332 |
| 6,303,217 B1 | 10/2001 | Malhotra et al. | 428/332 |
| 6,315,879 B1 | 11/2001 | Washburn et al. | 204/298 |
| 6,383,667 B1 | 5/2002 | Futamoto et al. | 428/694 |
| 6,500,567 B1 | 12/2002 | Bertero et al. | 428/667 |
| 6,567,236 B1 | 5/2003 | Doerner et al. | 360/97 |
| 6,596,417 B1 | 7/2003 | Hsu et al. | 428/694 |
| 6,645,551 B2* | 11/2003 | Wong | 427/128 |
| 6,830,837 B2* | 12/2004 | Kanbe et al. | 428/811.2 |
| 2002/0045069 A1 | 4/2002 | Shinohara et al. | 428/694 |
| 2002/0068199 A1 | 6/2002 | Futamoto et al. | 428/694 |
| 2002/0101692 A1 | 8/2002 | Fullterton et al. | 360/324 |
| 2002/0102440 A1 | 8/2002 | Shida et al. | 428/694 |
| 2002/0127433 A1 | 9/2002 | Shimizu et al. | 428/694 |
| 2002/0150796 A1 | 10/2002 | Kanbe | 428/694 |
| 2003/0008178 A1 | 1/2003 | Bian et al. | 428/694 |
| 2003/0090831 A1 | 5/2003 | Doerner et al. | 360/97 |
| 2003/0152805 A1 | 8/2003 | Bertero et al. | 428/692 |

OTHER PUBLICATIONS

Yu et al., "High Density Recording Media with CrMoB Underlayer".

* cited by examiner

*Primary Examiner*—Holly Rickman

(57) ABSTRACT

A magnetic recording medium constructed in accordance with the invention comprises a substrate, first, second and third underlayers formed over the substrate, and a magnetic data recording layer formed over the underlayers. The underlayers typically have a bcc crystal structure, and comprise Cr or Cr alloys. The magnetic data recording layer has a hcp crystal structure and comprises a Co alloy. The second underlayer typically comprises a material such as B, which tends to reduce the crystal size of the second underlayer and the layers deposited thereon, and also to increase crystal spacing.

34 Claims, 4 Drawing Sheets

MAGNETIC RECORDING MEDIUM HAVING NOVEL UNDERLAYER STRUCTURE

BACKGROUND OF THE INVENTION

This invention pertains to magnetic recording media.

FIG. 1 illustrates a typical prior art magnetic recording medium 1 comprising a substrate 2 (e.g. an aluminum alloy 2a plated with a NiP alloy 2b), a Cr (or Cr alloy) underlayer 4, a magnetic Co alloy layer 5, and a protective overcoat 6. NiP alloy layer 2b is textured prior to deposition of layers 4, 5 and 6. Cr underlayer 4 has a bcc crystal structure and a (200) crystal orientation. Underlayer 4 ensures that hcp Co alloy layer 5 nucleates and grows with 1 1 $\bar{2}$ 0 crystal orientation. Further, Cr underlayer 4 also ensures that magnetic Co alloy layer 5 exhibits magnetic anisotropy in the direction of texture lines formed in layer 3.

Instead of using a single Cr underlayer 4, it is known to form a recording medium 1a comprising first and second Cr underlayers 4a, 4b (FIG. 2). See, for example, U.S. Pat. No. 6,303,217, issued to Malhotra et al., which discusses a structure in which layer 4a is Cr, and layer 4b is a $CrMo_{20}$ alloy. (As used herein, a reference to an alloy $CrA_x$ refers to a composition $Cr_{100-x}A_x$. Similarly, $CrA_xB_y$ refers to a composition $Cr_{100-x-y}A_xB_y$.) Pure Cr is more compatible with NiP layer 2b than the $CrMo_{20}$ layer 4b, and $CrMo_{20}$ provides a better nucleating surface for the Co alloy than pure Cr. Thus, medium 1a of FIG. 2 exhibits better performance than medium 1 of FIG. 1. (Malhotra reports that medium 1a exhibits improved noise performance.)

SUMMARY OF THE INVENTION

A magnetic recording medium constructed in accordance with the invention comprises a substrate, a first underlayer formed on the substrate, a second underlayer formed on the first underlayer, a third underlayer formed on the second underlayer and a magnetic alloy layer formed on the third underlayer. The underlayers typically have a bcc crystal structure, and can comprise Cr or a Cr alloy. The magnetic alloy layer typically has a hcp crystal structure, and comprises a Co alloy.

In one embodiment, the substrate comprises glass, glass ceramic, or an aluminum alloy covered with an electroless plated nickel phosphorus alloy. In some instances, e.g. for the case of a glass or glass ceramic substrate, an amorphous metal layer is provided between the substrate and the first underlayer.

In one embodiment, the first underlayer comprises Cr or CrX, where X is one or more of Mo, Ta, W, Ru, O, Ti, Si, Cu or C. X can have a concentration from 0 to 40 at. %. As mentioned above, the first underlayer typically has a bcc crystal structure. The first underlayer serves as a nucleation layer.

The second underlayer typically comprises Cr and B, and can include one or more additional materials such as Mo, Ta, W, Ru, O, Ti, Si, Cu or C. B can have a concentration between 1 and 15 at. %, and in one embodiment, between 3 and 10 at. %. While not being bound by theory, it is believed that B (boron) tends to segregate at the crystal boundaries, and also tends to cause the crystals to be smaller than they would be in the absence of B. The crystals in the second underlayer serve as a template for growing crystals in the third underlayer and the magnetic alloy layer. Thus, the crystal size in the magnetic alloy layer is effectively reduced. Also, the above-mentioned segregation effect results in grain separation in the magnetic alloy layer. This also reduces the amount of noise exhibited by the medium.

The third underlayer typically comprises Cr, and can also include one or more additives, e.g. Mo, Ta, W, Ru, O, Ti, Si, Cu or C. If one forms a Co alloy magnetic layer directly on the second underlayer (containing B), the boron (which tends to migrate to the surface of the second underlayer) deleteriously affects epitaxial growth of the magnetic layer, and it is difficult to achieve a desired crystallographic texture. By providing the third underlayer (lacking or substantially lacking B), one prevents this effect.

If one attempts to form a boron-containing underlayer on the NiP-plated surface of the substrate, that hampers formation of the desired crystallographic texture. Accordingly, in a preferred embodiment, the first underlayer also lacks or substantially lacks boron.

The second underlayer can comprise additives in addition to B, e.g. Mo or Ta. Such additives can also reduce media noise by altering the stress at the grain boundaries and/or the above-mentioned segregation mechanism. Other additives that can exhibit the segregation phenomenon that can be provided in the second underlayer (in addition to B) include Si, P, $SiO_2$, or other materials exhibiting no or minimal solubility in Cr. Also, as mentioned above, W, Ru, O, Ti, Cu and/or C can be included.

These figures are not to scale.

DETAILED DESCRIPTION

First Embodiment of the Invention

Figure 1:
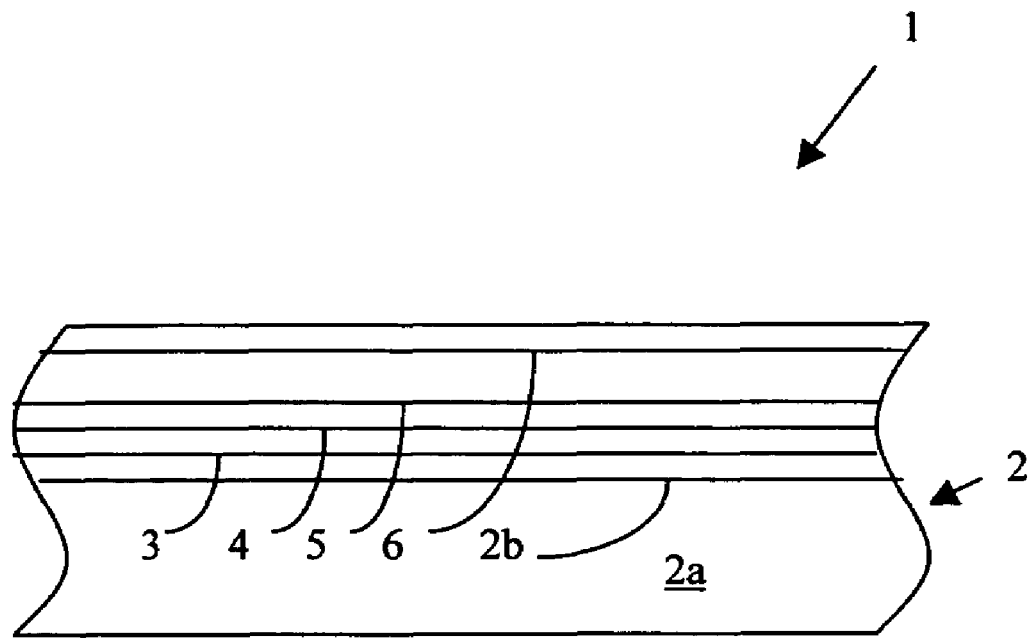
FIGS. 1 and 2 illustrate in cross section magnetic recording media constructed in accordance with the prior art.
Figure 2:
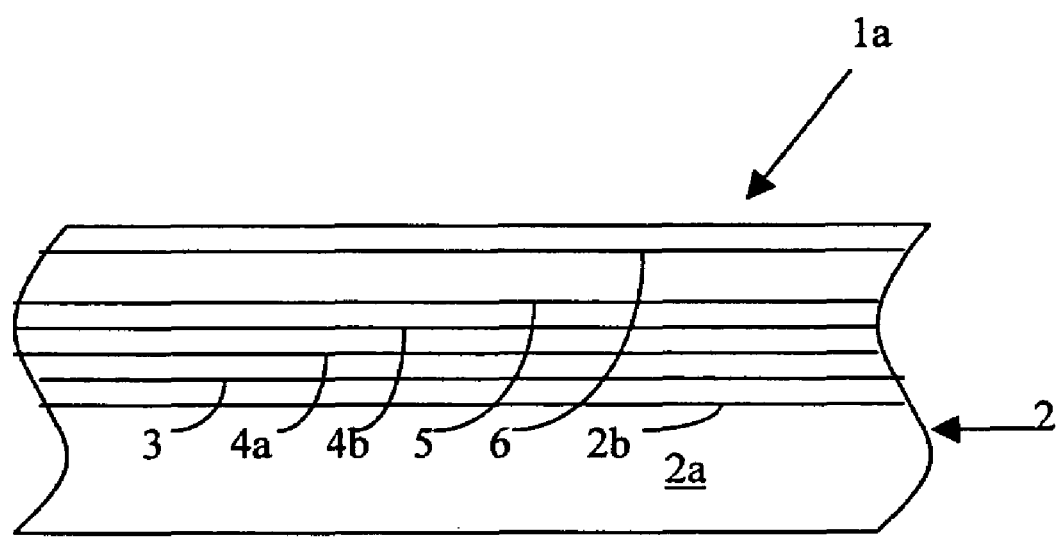
Figure 3:
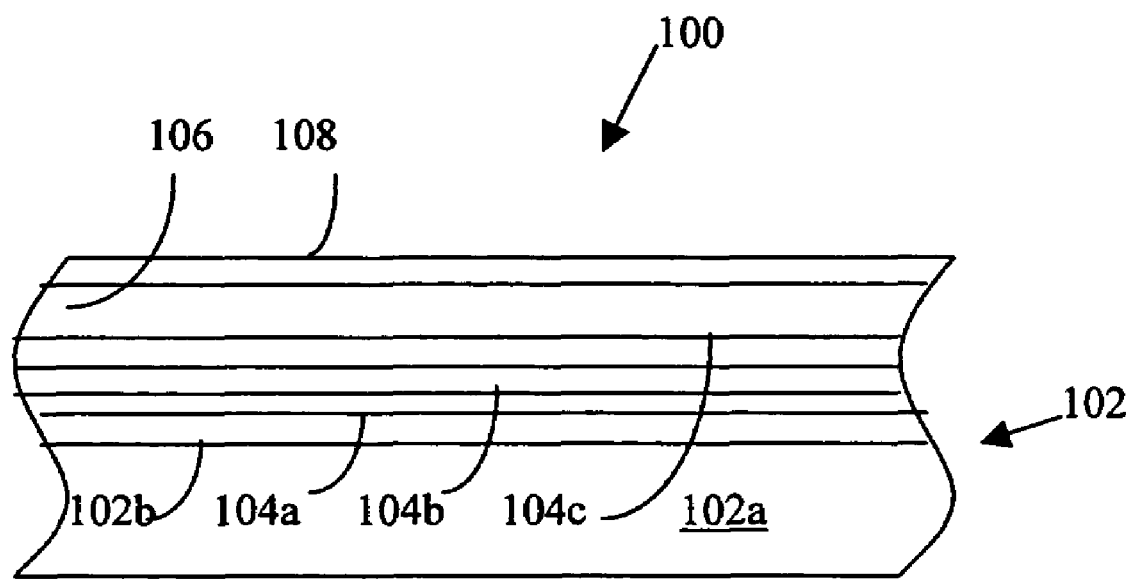
FIG. 3 illustrates in cross section a magnetic recording medium constructed in accordance with a first embodiment of the invention.

A recording medium 100 (FIG. 3) constructed in accordance with one embodiment of the invention comprises a substrate 102, three underlayers 104a, 104b, 104c, a magnetic layer 106, and a protective overcoat 108. Substrate 102 typically comprises an aluminum alloy substrate 102a covered with electroless plated Nip 102b. However, substrate 102 could comprise glass, glass ceramic or other structures as well.

Texture lines are typically formed in the surface of NiP layer 102b, e.g. using a mechanical texturing process. These texture lines typically extend in the circumferential direction, or generally in the circumferential direction (with some cross-hatching). Optionally, this can be accomplished using a method as described in U.S. patent application Ser. No. 10/299,028, filed by Andrew Homola on Nov. 18, 2002, incorporated herein by reference.

Underlayers 104a, 104b and 104c are typically formed by sputtering or other vacuum deposition technique. For example, in-line or static sputtering apparatus can be used. (The sputtering apparatus can be an Anelva 3010 system, an Ulvac SHD inline system, an Intevac 250B system or other system.) Sputtering can be accomplished in an Ar atmosphere between 3 and 10 mTorr, while between 100 and 1000 W are applied to the sputtering target. In one embodiment, layer 104a is Cr or a Cr alloy, e.g. $CrMo_6$ or $CrO_{0.5}$. Layer 104b is a Cr alloy such as CrB, CrRuB CrMoB. For example, layer 104b can be $CrMo_xB_y$, where x is between 10 and 25 and y is between 1 and 10, e.g. $CrB_1$, $CrB_2$, $CrB_5$, $CrB_7$, $CrB_{10}$, $CrMo_{10}B_5$, $CrMo_{15}B_5$, $CrMo_{15}B_7$, $CrMo_{15}Ti_5B_3$, $CrRu_5B_5$ or $CrTi_5B_5$. Layer 104c is $CrMo_x$ alloy where x is between 10 and 25, e.g. $CrMo_{15}$, $CrMo_{20}$, $CrMo_{25}$, $CrMo_{20}Ta_2$ or $CrMo_{15}Ru_5$. Layers 104 can be from 1.5 to 10 nm thick, e.g. between 2 and 5 nm thick. In one embodiment, layers 104a, 104b and 104c are 3, 2 and 2 nm thick respectively. In another embodiment, they are 4, 2.5 and 2.5 nm thick.

Layer 106 is typically a Co magnetic alloy, and can have a composition as set forth below. Layer 108 can be carbon, hydrogenated carbon, nitrogenated carbon, carbon including both hydrogen and nitrogen, a ceramic material such as zirconia, or other appropriate hard material. The over coat can have a structure as described in U.S. Pat. No. 6,565,719, issued to Lairson et al. on May 20, 2003, incorporated herein by reference. Layers 106 and 108 can be formed by a vacuum deposition technique such as sputtering. In addition, other deposition processes such as those described by Lairson can be used. Typically, a lubricant (not shown), also as described by Lairson, can be applied to the medium.

Although the figures only show the various layers deposited on one side of substrate 102 (for ease of illustration), the above-described layers can also be (and typically are) deposited on both sides of substrate 102.

Layers 104a, 104b and 104c typically have a bcc crystal structure and a (200) crystal orientation. Preferably, the dominant component of layers 104a, 104b and 104c is Cr.

Layer 106 is a magnetic hcp Co alloy having a 1 1 $\bar{2}$ 0 crystal orientation. Underlayers 104 facilitate the 1 1 $\bar{2}$ 0 orientation of layer 106, as well as magnetic anisotropy generally along the direction of texture lines formed in substrate 102. Layer 106 is used for longitudinal recording.

As mentioned above, a magnetic disk constructed in accordance with the invention exhibits a superior signal to noise ratio ("SNR"). Table I below shows the result of an experiment comparing disks A and B. Disk A was constructed in accordance with the prior art, and comprised a NiP-plated Al alloy substrate, a 4 nm thick Cr first underlayer, a 4 nm thick CrMo second underlayer, and a CoPtBCr magnetic alloy. Disk B included a Cr first underlayer, a CrMoB second underlayer, and a CrMo third underlayer. (The underlayers were 3, 2.5 and 2.5 nm thick, respectively.) As can be seen, disk B (constructed in accordance with the invention) exhibited a superior SNR. As mentioned above, it is believed that this is due to the fact that boron tends to reduce the grain size and increase grain separation of the second underlayer. This reduced grain size and increased grain separation cause the same effect in the third underlayer and magnetic layer, thereby reducing media noise.

TABLE I

| Disk | Underlayer Structure | Media SNR (dB) | Total SNR (dB) |
|---|---|---|---|
| A | Cr/CrMo | 22.4 | 20.6 |
| B | Cr/CrMoB/CrMo | 22.9 | 20.9 |

Table II below compares the noise characteristics of disk C (comprising a first Cr underlayer and a second CrMo underlayer) with disk D (comprising a first Cr underlayer, a second CrB underlayer and a third CrMo underlayer). The underlayer thicknesses for table II were the same as table I. Again, it can be seen that the SNR of disk D was better (greater) than that of disk C.

TABLE II

| Disk | Underlayer Structure | Media SNR (dB) | Total SNR (dB) |
|---|---|---|---|
| C | Cr/CrMo | 21.0 | 19.5 |
| D | Cr/CrB/CrMo | 21.5 | 20.0 |

Table III below compares the noise characteristics of a disk E (comprising a first Cr underlayer and a second CrMo underlayer) with disk F (comprising a first Cr underlayer, a second CrRuB underlayer and a third CrMo underlayer). The layer thicknesses for table III were the same as for tables I and II. Again, it can be seen that the SNR of disk F (comprising three underlayers, including a middle underlayer comprising B) was better (greater) than that of disk E (having only two underlayers).

TABLE III

| Disk | Underlayer Structure | Media SNR (dB) | Total SNR (dB) |
|---|---|---|---|
| E | Cr/CrMo | 20.9 | 19.4 |
| F | Cr/CrRuB/CrMo | 21.5 | 19.9 |

(In alternative embodiments in which layer 104b comprises CrRuB, the Ru content can be between 2 and 20 at. % and the B content can be between 1 and 10 at. %.

Table IV below compares disk G (comprising two underlayers) and disks H, I, J, and K (comprising three underlayers having varying thicknesses). As can be seen, disks comprising three underlayers constructed in accordance with the present invention exhibited superior SNRs. This effect was somewhat insensitive to layer thickness.

TABLE IV

| Disks | Underlayer Structure | Media SNR (dB) | Total SNR (dB) |
|---|---|---|---|
| G | 5 nm CrMo/3 nm CrMo | 16.5 | 15.6 |
| H | 2.6 nm CrMo/2.6 nm CrMoB/2.6 nm CrMo | 16.9 | 16.0 |
| I | 3 nm CrMo/3 nm CrMoB/3 nm CrMo | 17.1 | 16.2 |
| J | 3.4 nm CrMo/3.4 nm CrMoB/3.4 nm CrMo | 16.8 | 16.0 |
| K | 4 nm CrMo/2 nm CrMoB/2 nm CrMo | 16.8 | 16.0 |

As mentioned above, without the presence of third underlayer 104c (which substantially lacks boron), boron in layer 104b would deleteriously affect epitaxial growth of magnetic layer 106. TABLE V, below, illustrates the signal to noise ratio for disk L, lacking layer 104c, and disk M, including layer 104c. As can be seen, disk M exhibits superior noise performance compared to disk L.

TABLE V

| Disk | Underlayer Structure | Media SNR (dB) | Total SNR (dB) |
|---|---|---|---|
| L | Cr/CrMoB | 21.5 | 19.8 |
| M | Cr/CrMoB/CrMo | 22.9 | 20.9 |

Second Embodiment of the Invention

Figure 4:
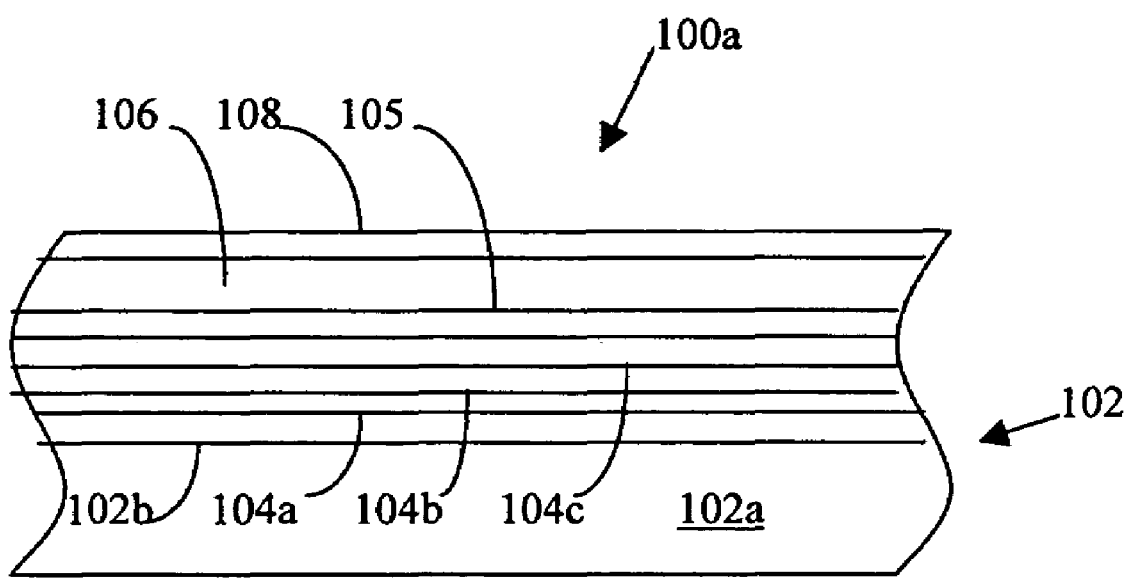
FIG. 4 illustrates in cross section a magnetic recording medium constructed in accordance with a second embodiment of the invention.

Referring to FIG. 4, in an alternative embodiment of the present invention, a nucleation layer 105 is provided between third underlayer 104c and magnetic alloy 106. Nucleation layer 105 is typically a hcp CoCr alloy that facilitates in-plane orientation of magnetic alloy 106. Details concerning nucleation layer 105 are discussed in U.S. Pat. No. 6,500,567, issued to Bertero et al. on Dec. 31, 2002, incorporated herein by reference. In one embodiment, layer 105 also comprises Ta in addition to Co and Cr, and is deposited at a relatively slow rate. Layer 105 facilitates lattice matching between underlayer 104c and magnetic alloy 106.

Third Embodiment of the Invention

Figure 5:
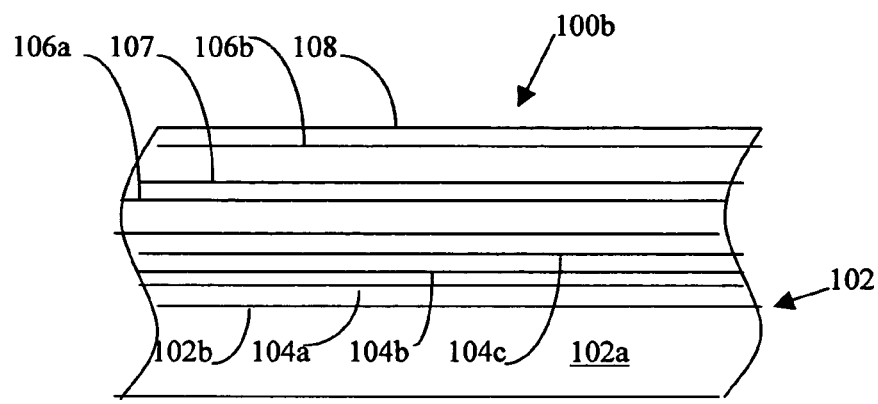
FIG. 5 illustrates in cross section a magnetic recording medium constructed in accordance with a third embodiment of the invention.

Referring to FIG. 5, in a third embodiment, a magnetic disk constructed in accordance with the invention includes a first magnetic layer 106a formed on third underlayer 104c, an intermediate layer 107 (typically Ru), and a second magnetic layer 106b formed on intermediate layer 107. Intermediate layer 107 is typically from 3 to 10 angstroms thick, and facilitates antiferromagnetic coupling between magnetic layers 106a and 106b. The antiferromagnetic coupling enhances the thermal stability of the recording medium while reducing the length of the transition region between adjacent magnetized regions. Details concerning such an antiferromagnetic layer, and magnetic films that can be used in conjunction therewith, are set forth in U.S. patent application Ser. No. 10/075,123, filed by Bertero et al. on Feb. 12, 2002 (publication no. 2003/0152805, published on Aug. 14, 2003), incorporated herein by reference.

Fourth Embodiment of the Invention

Figure 6:
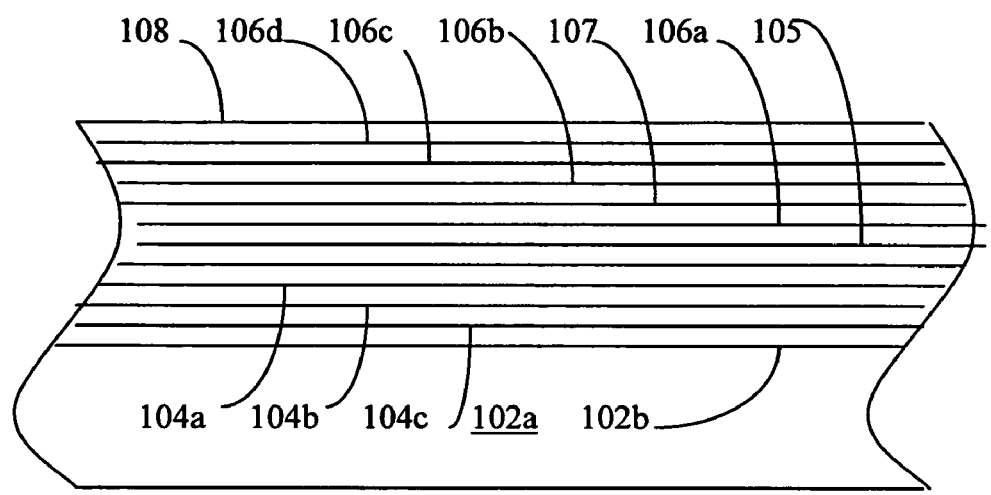
FIG. 6 illustrates in cross section a magnetic recording medium constructed in accordance with a fourth embodiment of the invention.

A magnetic recording medium in accordance with the embodiment of FIG. 6 comprises a top magnetic layer 106d, which can be $CoCr_aPt_bB_c$, where a is 9 to 18, b is 8 to 16 and c is 8 to 18. Thereunder, magnetic layer 106c can be $CoCr_dPt_eX_fB_g$, where d is 20 to 25, e is 8 to 16, X can be W, Ta, V or Ti, f can be 0 to 5 and g can be 0 to 10. Thereunder, magnetic layer 106b can be $CoCr_hTa_iB_j$, where h is 10 to 20, i is 0 to 7 and j is 0 to 6. Thereunder is Ru intermediate layer 107, under which is magnetic layer 106a. Layer 106a can be $CoCr_kTa_lB_m$, where k is 10 to 20, l is 0 to 7 and m is 0 to 6. Thereunder is a nucleation layer 105 which can be $CoCr_nTa_oB_p$, where n is 12 to 25, o is 0 to 5 and p is 0 to 6.

INDUSTRIAL APPLICATION

Figure 7:
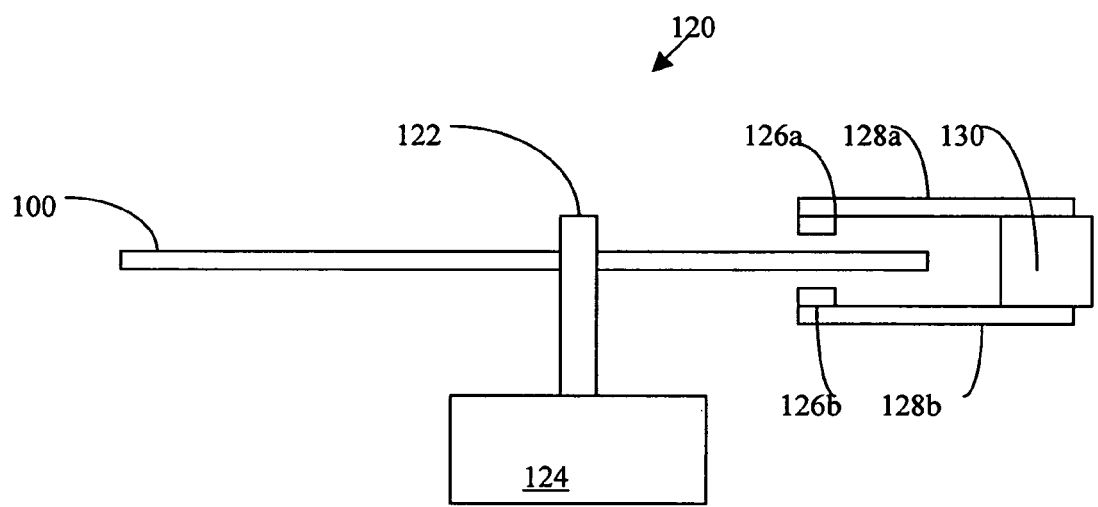
FIG. 7 illustrates in cross section a magnetic disk drive comprising a magnetic recording medium constructed in accordance with the invention.

A magnetic recording medium constructed in accordance with the invention is typically a magnetic disk incorporated within a disk drive (e.g. disk 100 incorporated within disk drive 120, as illustrated in FIG. 7). Disk 100 is mounted on a spindle 122, which in turn is coupled to and rotated by a motor 124. A pair of read-write heads 126a, 126b fly in close proximity to disk 100, and read data from and write data to the magnetic recording layer on each side of disk 100. Read-write heads 126a, 126b are mounted on arms 128a, 128b, which in turn are coupled to a rotary actuator 130 for moving heads 126a, 126b next to the various tracks on disk 100.

While FIG. 7 illustrates one disk within drive 120, in other embodiments, more than one disk can be within drive 120. Also, while FIG. 6 shows two read-write heads 126a, 126b for reading and writing data on both sides of disk 100, in other embodiments, only one read-write head is provided for reading data from or writing data to only one side of disk 100.

While the invention has been described with respect to specific embodiments, those skilled in the art will appreciate that changes can be made inform and detail without departing from the spirit and scope of the invention. For example, additional layers can be inserted between the above-described layers. Also, additional materials can be incorporated within the above-described layers. First and third underlayers 104a, 104c can have a small amount of boron, e.g. less than 1 at. %. However, the boron content is not so much as to degrade noise or grain size control or cause the loss of crystallographic texture. Different layer thicknesses and compositions can be employed. Accordingly, all such changes come within the present invention.

We claim:

1. A magnetic recording medium comprising:
a substrate;
a first bcc underlayer formed on said substrate;
a second bcc underlayer formed over the first underlayer, said second underlayer comprising boron;
a third bcc underlayer substantially lacking boron formed over the second bcc underlayer; and
a magnetic alloy data recording layer.

2. Medium of claim 1 wherein said first, second and third underlayers comprise bcc Cr alloys, and the magnetic alloy data recording layer comprises a hcp Co alloy.

3. Medium of claim 2 wherein said first underlayer substantially lacks boron.

4. A magnetic recording medium comprising:
a substrate;
a first bcc underlayer formed on said substrate;
a second bcc underlayer formed over the first underlayer, said second underlayer comprising boron;
a third bcc underlayer formed over the second bcc underlayer; and
a magnetic alloy data recording layer,
wherein said first, second and third underlayers comprise bcc Cr alloys, and the magnetic alloy data recording layer comprises a hcp Co alloy,
and wherein said first and third underlayers comprise less than 1% boron.

5. Medium of claim 1 wherein said boron in said second underlayer causes grain separation in said magnetic alloy data recording layer.

6. Medium of claim 1 wherein said boron in said second underlayer causes a reduction in grain size in said magnetic alloy data recording layer.

7. Medium of claim 1 wherein said boron reduces noise in said magnetic recording medium.

8. Medium of claim 1 further comprising a nucleation layer formed between said third underlayer and said magnetic alloy data recording layer.

9. Medium of claim 1 further comprising an amorphous metallic layer between said substrate and said first underlayer.

10. Medium of claim 1 further comprising a coupling layer formed on said magnetic alloy data recording layer and a second magnetic layer formed on said coupling layer, wherein said magnetic alloy data recording layer and said second magnetic layer are antiferromagnetically coupled to one another.

11. A magnetic disk drive comprising the magnetic recording medium of claim 1.

12. A magnetic recording medium comprising:
a substrate;
a first underlayer comprising Cr formed on said substrate;
a second underlayer comprising Cr and at least one additive formed on said first underlayer;
a third underlayer comprising Cr formed on said second underlayer, said third underlayer having a bcc crystal structure and substantially lacking boron; and
a magnetic alloy data recording layer formed on said third underlayer, said additive causing grain separation in said magnetic alloy data recording layer.

13. Medium of claim 12 wherein said first and second underlayers have a bcc crystal structure and said magnetic alloy data recording layer comprises a hcp Co alloy, and said first and third underlayers substantially lack said additive.

14. Medium of claim 12 wherein said additive reduces noise and grain size in said magnetic alloy data recording layer.

15. Medium of claim 12 further comprising a nucleation layer formed between said third underlayer and said magnetic alloy data recording layer.

16. Medium of claim 12 further comprising an amorphous metallic layer between said substrate and said first underlayer.

17. Medium of claim 12 further comprising a coupling layer formed on said magnetic alloy data recording layer and a second magnetic layer formed on said coupling layer, wherein said magnetic alloy data recording layer and said second magnetic layer are antiferromagnetically coupled to each other.

18. A magnetic disk drive comprising the magnetic recording medium of claim 12.

19. A magnetic recording medium comprising:
a substrate;
a first underlayer comprising Cr formed on said substrate;
a second underlayer comprising Cr and at least one additive formed on said first underlayer;
a third underlayer comprising Cr formed on said second underlayer, said third underlayer having a bcc crystal structure, said third underlayer substantially lacking boron; and
a magnetic alloy data recording layer formed on said third underlayer, said additive causing grain size reduction in said magnetic alloy data recording layer.

20. Medium of claim 19 wherein said first and second underlayers have a bcc crystal structure and said magnetic alloy data recording layer comprises a hcp Co alloy, and said first and third underlayer substantially lack said additive.

21. Medium of claim 19 further comprising a nucleation layer formed between said third underlayer and said magnetic alloy data recording layer.

22. Medium of claim 19 further comprising an amorphous metallic layer between said substrate and said first underlayer.

23. Medium of claim 19 further comprising a coupling layer formed on said magnetic alloy data recording layer and a second magnetic layer formed on said coupling layer, wherein said magnetic alloy data recording layer and said second magnetic layer are antiferromagnetically coupled to each other.

24. A magnetic disk drive comprising the magnetic recording medium of claim 19.

25. Magnetic recording medium of claim 1 wherein said third bcc underlayer lacks boron.

26. Magnetic recording medium of claim 12 wherein said third underlayer lacks boron.

27. A magnetic recording medium comprising:
a substrate;
a first underlayer comprising Cr formed on said substrate;
a second underlayer comprising Cr and at least one additive formed on said first underlayer;
a third underlayer comprising Cr formed on said second underlayer, said third underlayer having a bcc crystal structure; and
a magnetic alloy data recording layer formed on said third underlayer, said additive causing grain separation in said magnetic alloy data recording layer, wherein the content of boron in said third underlayer is less than 1%.

28. A magnetic recording medium comprising:
a substrate;
a first underlayer comprising Cr formed on said substrate;
a second underlayer comprising Cr and at least one additive formed on said first underlayer;
a third underlayer comprising Cr formed on said second underlayer, said third underlayer having a bcc crystal structure; and
a magnetic alloy data recording layer formed on said third underlayer, said additive causing grain size reduction in said magnetic alloy data recording layer, wherein the content of boron in said third underlayer is less than 1%.

29. Magnetic recording medium of claim 19 wherein said third underlayer lacks boron.

30. Magnetic recording medium of claim 1 wherein the boron in said third bcc underlayer, if any, is of insufficient concentration to degrade the SNR.

31. Magnetic recording medium of claim 1 wherein the boron in said third bcc underlayer, if any, is of insufficient concentration to degrade grain size control.

32. Magnetic recording medium of claim 1 wherein said magnetic alloy comprises a 1 1 $\bar{2}$ 0 hcp Co alloy.

33. A method for manufacturing a magnetic recording medium comprising:
depositing a first bcc underlayer formed on a substrate;
depositing a second bcc underlayer over the first underlayer, said second underlayer comprising boron;
depositing a third bcc underlayer substantially lacking boron over the second bcc underlayer; and
depositing a magnetic alloy data recording layer.

34. Magnetic recording medium of claim 1 wherein said third bcc underlayer comprises a $CrMo_x$ alloy, where x is between 10 and 25.

* * * * *

UNITED STATES PATENT AND TRADEMARK OFFICE
CERTIFICATE OF CORRECTION

PATENT NO.       : 7,179,549 B2                                               Page 1 of 1
APPLICATION NO.  : 10/761820
DATED            : February 20, 2007
INVENTOR(S)      : Sudhir S. Malhotra et al.

It is certified that error appears in the above-identified patent and that said Letters Patent is hereby corrected as shown below:

Claim 33, col. 8, line 49, delete the word "formed".

Signed and Sealed this

Tenth Day of April, 2007

JON W. DUDAS
*Director of the United States Patent and Trademark Office*